(12) United States Patent
Sato (10) Patent No.: US 6,201,517 B1
(45) Date of Patent: Mar. 13, 2001

(54) STEREOSCOPIC IMAGE DISPLAY APPARATUS (75) Inventor: Akira Sato, Shiga-Ken (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/028,626

(22) Filed: Feb. 24, 1998

(30) Foreign Application Priority Data

Feb. 27, 1997 (JP) .................................................. H9-043468

(51) Int. Cl.$^7$ ....................................................... G09G 5/00
(52) U.S. Cl. .................................. 345/7; 345/8; 345/51; 345/52; 345/53
(58) Field of Search .................................... 345/428, 429, 345/8, 7, 51, 52, 53; 351/158; 359/462, 466

(56) References Cited

U.S. PATENT DOCUMENTS

| | | | |
|---|---|---|---|
| 5,014,126 | * 5/1991 | Pritchard et al. | 358/91 |
| 5,355,181 | 10/1994 | Ashizaki et al. | 348/744 |
| 5,446,834 | * 8/1995 | Deering | 395/127 |
| 5,467,104 | * 11/1995 | Furness, III et al. | 345/8 |
| 5,712,732 | * 1/1998 | Street | 359/630 |
| 5,825,456 | * 10/1998 | Tabata et al. | 351/201 |
| 5,886,675 | * 3/1999 | Aye et al. | 345/7 |
| 5,929,859 | * 7/1999 | Meijers | 345/419 |
| 5,952,993 | * 9/1999 | Matsuda et al. | 345/121 |

FOREIGN PATENT DOCUMENTS

| | | |
|---|---|---|
| 6-235885 | 8/1994 | (JP) . |
| 7-030928 | 1/1995 | (JP) . |
| 7-128613 | 5/1995 | (JP) . |
| 8-166559 | 6/1996 | (JP) . |

* cited by examiner

Primary Examiner—William A. Cuchlinski, Jr.
Assistant Examiner—Marthe Y. Marc-Coleman
(74) Attorney, Agent, or Firm—Sidley & Austin (57) ABSTRACT A display apparatus displays an image based on image data and distance data concerning each pixel. The display apparatus has a detector, a display data generator. The detector detects a visual range from a viewer's eye to the viewer's point of regard. The generator produces display data based on the image data, the distance data and the visual range. The display apparatus further has an image display, projector and controller. The image display displays an image based on the display data. The projector projects the displayed image as a virtual image. The controller controls a projection distance of the virtual image so that the virtual image is projected onto the point of regard.

23 Claims, 13 Drawing Sheets

STEREOSCOPIC IMAGE DISPLAY APPARATUS

BACKGROUND OF THE INVENTION

1. Field of the Invention

The present invention relates to a stereoscopic image display apparatus, for example, to a stereoscopic image display apparatus used as a head mounted display (HMD) and enabling a stereoscopic image to be viewed as a virtual image.

2. Description of the Prior Art

A conventional HMD is designed so that virtual images for the right eye and for the left eye are projected at a predetermined distance and a stereoscopic image is displayed based on the binocular parallax. According to this HMD, since the focusing function of the human eye is ignored, the eyes are fatigued if a stereoscopic image is viewed for a long time. A stereoscopic image display apparatus intended to solve this problem is disclosed in Japanese Laid-open Patent Application No. H6-235885. In this apparatus, the directions of the lines of sight of both eyes are detected to thereby obtain the convergence position of the eyes and a virtual image is projected onto the convergence position of the eyes.

As another apparatus for displaying a stereoscopic image, an HMD of a laser scanning type (which displays images directly on the retina) is disclosed in U.S. Pat. No. 5,355,181. In this apparatus, a stereoscopic image is displayed by performing focusing at high speed based on distance data concerning each pixel of the image while performing laser scanning.

The apparatus disclosed in Japanese Laid-open Patent Application No. H6-235885 employs a principle that the imaging position is caused to coincide with the convergence position of the eyes by automatically adjusting the imaging position of the displayed image in accordance with variation in convergence position of the left and right eyes. However, since the pupil distance varies among people, it is difficult to obtain the convergence position of the viewer's eyes with accuracy. If the imaging position of the displayed image is inaccurately adjusted, the convergence position of the eyes and the imaging position do not coincide with each other, so that the eyes are apt to get fatigued.

When a close object placed before a far background is viewed through a stereoscopic image display apparatus, it is desirable that the edge of the clear-cut object placed in the foreground should be clearly seen in front of the blurred background. However, according to the apparatus disclosed in U.S. Pat. No. 5,355,181, the image of the blurred background enters the edge of the object placed in the foreground, so that an overlapping image is viewed. For this reason, the displayed stereoscopic image is unnatural and the reality is impaired.

SUMMARY OF THE INVENTION

An object of the present invention is to provide a stereoscopic image display apparatus capable of displaying natural stereoscopic images which hardly fatigue the eyes.

To achieve the above object, according to one aspect of the present invention, a display apparatus for displaying an image based on image data and distance data concerning each pixel is provided with means for detecting a visual range from a viewer's eye to the viewer's point of regard; means for generating display data based on the image data, the distance data and the visual range; means for displaying an image based on the display data; means for projecting the displayed image as a virtual image; and means for controlling a projection distance of the virtual image so that the virtual image is projected onto the point of regard.

According to another aspect of the present invention, a display apparatus for displaying an image based on image data and distance data concerning each pixel is provided with first means for displaying so as to focus an image situated at a predetermined distance, and second means for displaying so as to blur an image not situated at the predetermined distance.

According to still another aspect of the present invention, a display apparatus is provided with means for receiving image data; means for detecting a visual range; means for performing a blurring processing on the image data in accordance with the detected visual range; and means for displaying an image based on the image data on which the blurring processing has been performed.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, a stereoscopic image display apparatus embodying the present invention will be described with reference to the drawings. For the display of stereoscopic images according to this embodiment, image display data are used which are generated from image data of an original image constituted by a plurality of pixels and distance data concerning each pixel of the original image. The image data and the distance data are normally generated by hardware or software of existing apparatuses as discussed later.

<<Stereoscopic Image Display Principle (FIGS. 1, 2A–2C, 3A–3C, and 4A–4C)>>

Figure 1:
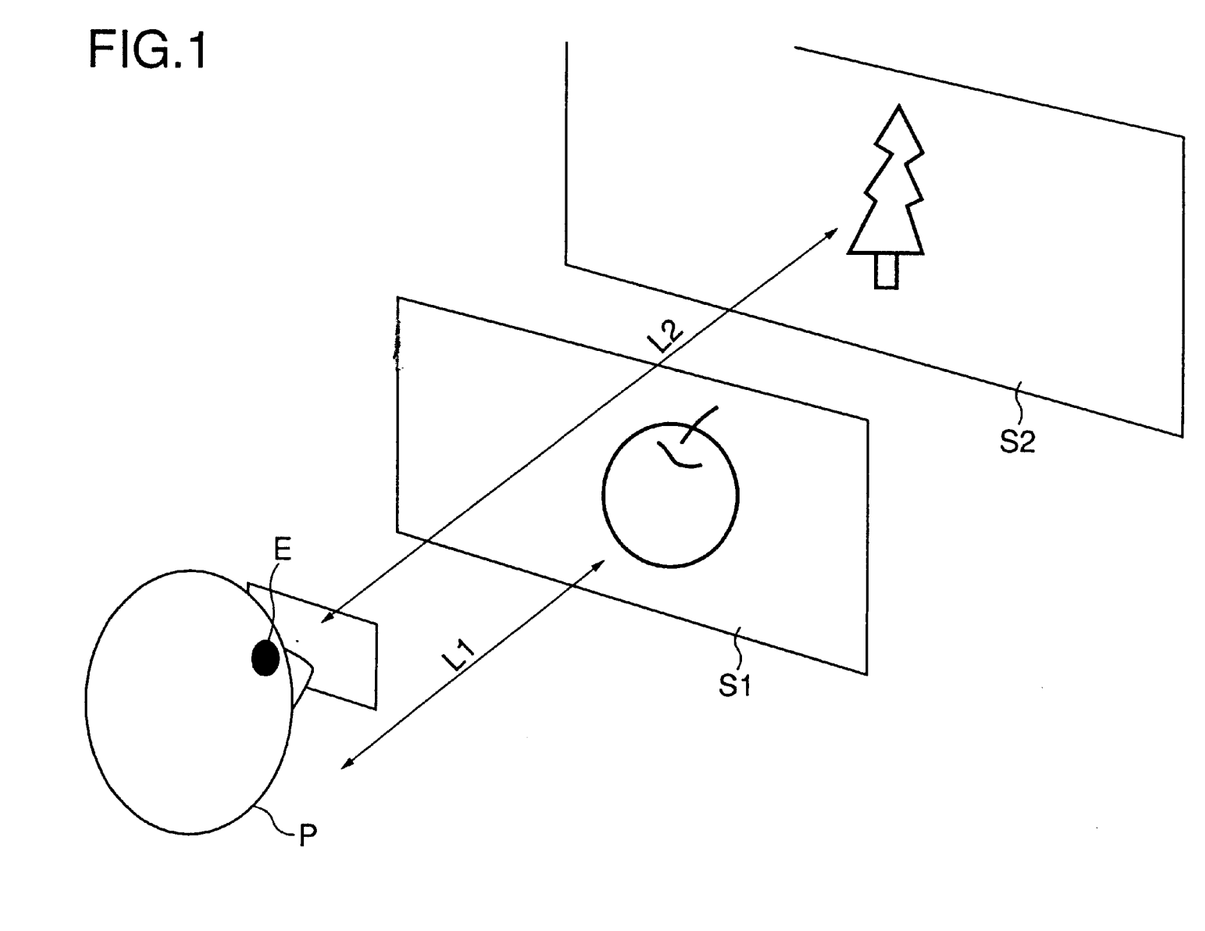
FIG. 1 is a schematic view of assistance in explaining the display principle employed by a stereoscopic image display apparatus embodying the present invention.
Figure 2A:
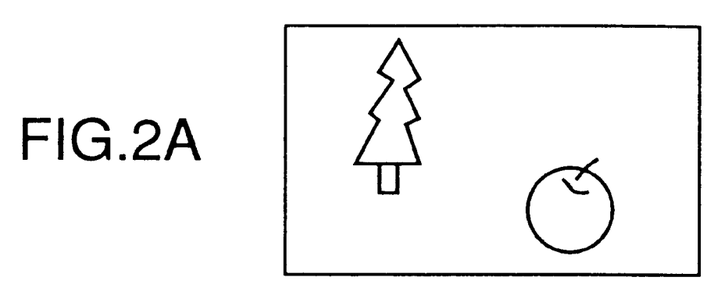
FIG. 2A shows the original image in FIG. 1.

First, the stereoscopic image display principle employed by this embodiment will be described. FIG. 1 shows a relationship between objects (an apple and a tree) viewed by a viewer P and projection distances L1 and L2. FIG. 2A shows the original image prepared therefor (it is assumed that there are no blurred portions in the original image). A case will be considered where the images of the apple and the tree in the original image are viewed by the viewer P. When a stereoscopic image is displayed so that the distance from the viewer P to the apple and the distance from the viewer P to the tree are different, so that a stereoscopic image is viewed which is natural and friendly to an eye E, it is necessary to vary the projection distance of a virtual image in accordance with the distance at which the eye E of the viewer P is in focus (i.e. the visual range of the viewer P). Therefore, in the case where the distance from the viewer P to the apple is 2 m and the distance from the viewer P to the tree is 50 m, when the eye E is focused on the apple, a virtual image S1 is moved so that the projection distance L1 is 2 m and when the eye E is focused on the tree, a virtual image S2 is moved so that the projection distance L2 is 50 m.

Figure 2B:
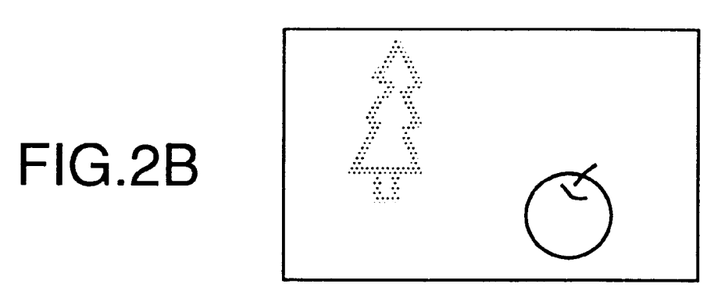
FIGS. 2B and 2C show viewed images in FIG. 1.
Figure 2C:
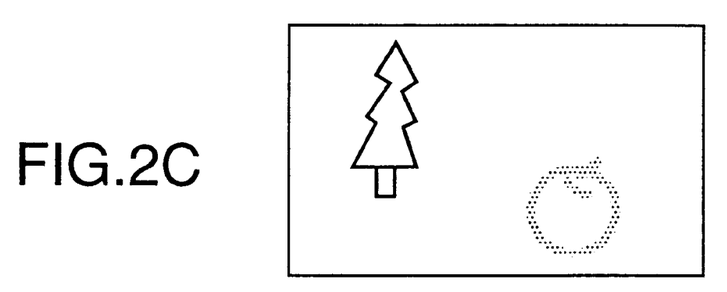

Simultaneously therewith, image processing for increasing the stereoscopic effect is performed on the images to be projected. Specifically, when the viewer P is viewing the apple situated 2 m away, image processing is performed so that the apple is viewed clearly and the tree is blurred as shown in FIG. 2B. When the viewer P is viewing the tree situated 50 m away, image processing is performed so that the tree is viewed clearly and the apple is blurred as shown in FIG. 2C. Thus, when two or more objects, situated at different distances from the viewer P, are present in the original image, a distance relationship (i.e. distance data) is detected for the pixels constituting each object and the object which the viewer P is not viewing is displayed as blurred, thereby forming a natural stereoscopic image having perspective.

Figure 3A:
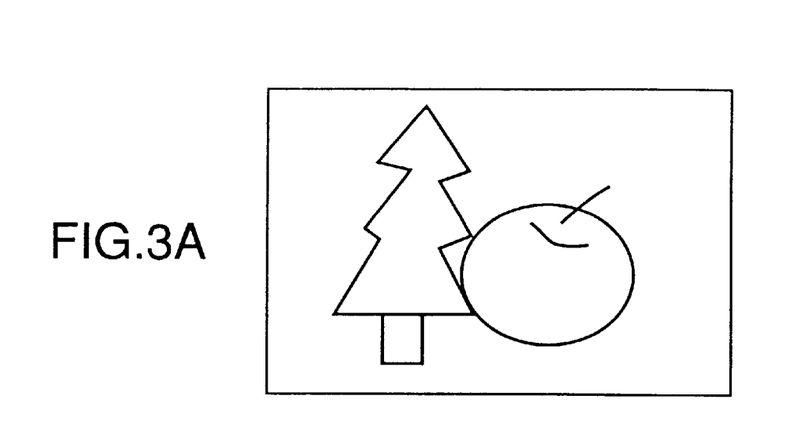
FIGS. 3A to 3C show blurred image generation conditions for an original image in which objects are close to each other.
Figure 3B:
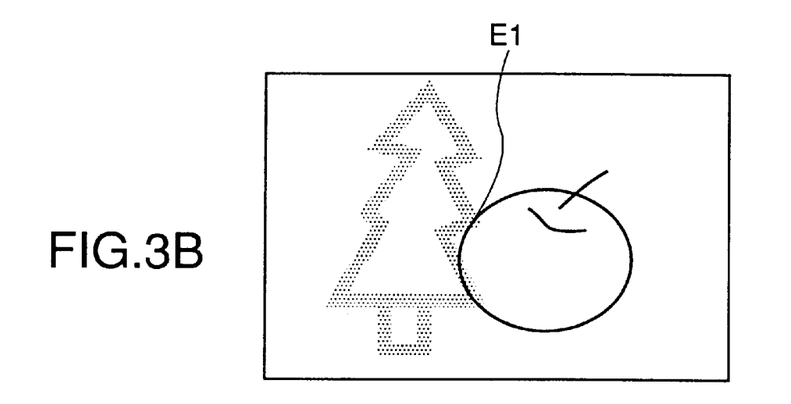
Figure 3C:
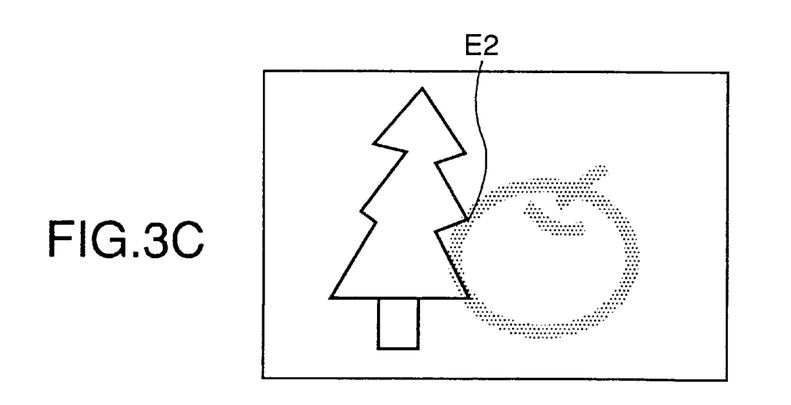
Figure 4A:
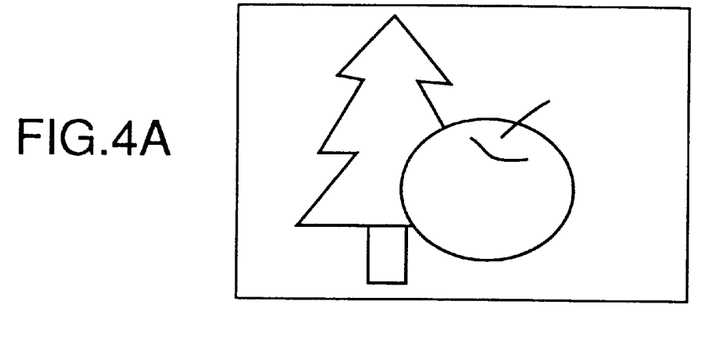
FIGS. 4A to 4C show blurred image generation conditions for an original image in which objects overlap each other.
Figure 4B:
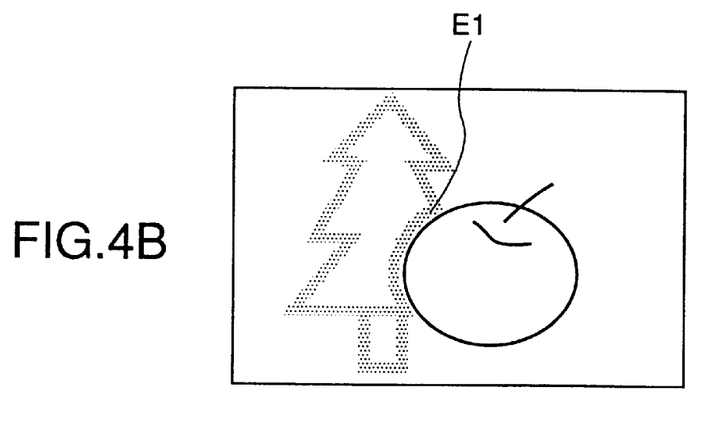
Figure 4C:
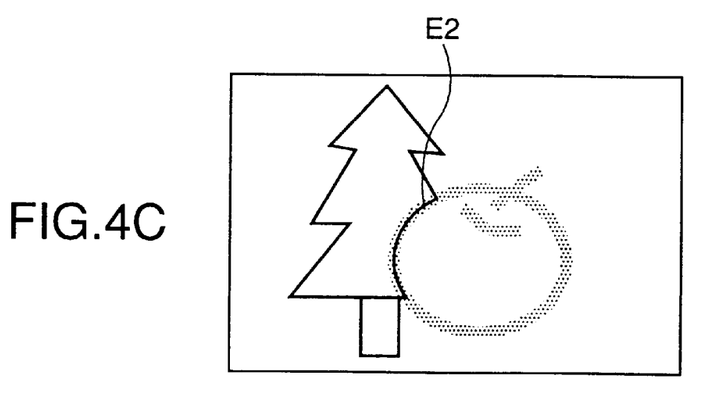

When the apple and the tree are viewed being close to each other or overlapping each other, image processing as described below is performed. FIGS. 3A to 3C show images in which the apple and the tree are close to each other. FIGS. 4A to 4C show images in which the apple and the tree overlap each other. Of these figures, FIGS. 3A and 4A show the original images, FIGS. 3B and 4B show images of a case where the viewer P is viewing the apple, and FIGS. 3C and 4C show images where the viewer P is viewing the tree.

When the viewer P is viewing the apple situated 2 m away, as shown at portions E1 of FIGS. 3B and 4B, a blurred image is generated such that the edge of the blurred tree in the background does not overlap the clear apple in the foreground. When the viewer P is viewing the tree situated 50 m away, as shown at portions E2 of FIGS. 3C and 4C, a blurred image is generated such that the edge of the blurred apple in the foreground overlaps the clear tree in the background. Thus, when two or more objects situated at different distances from the viewer P are viewed being close to each other or overlapping each other, a distance relationship (i.e. distance data) concerning the pixels constituting each object is detected and the objects are displayed overlapping each other only when the blurred object is situated in the foreground, thereby forming a more natural stereoscopic image having perspective.

<<Basic Construction and Display Procedure of the Embodiment (FIGS. 5 and 6)>>

Figure 5:
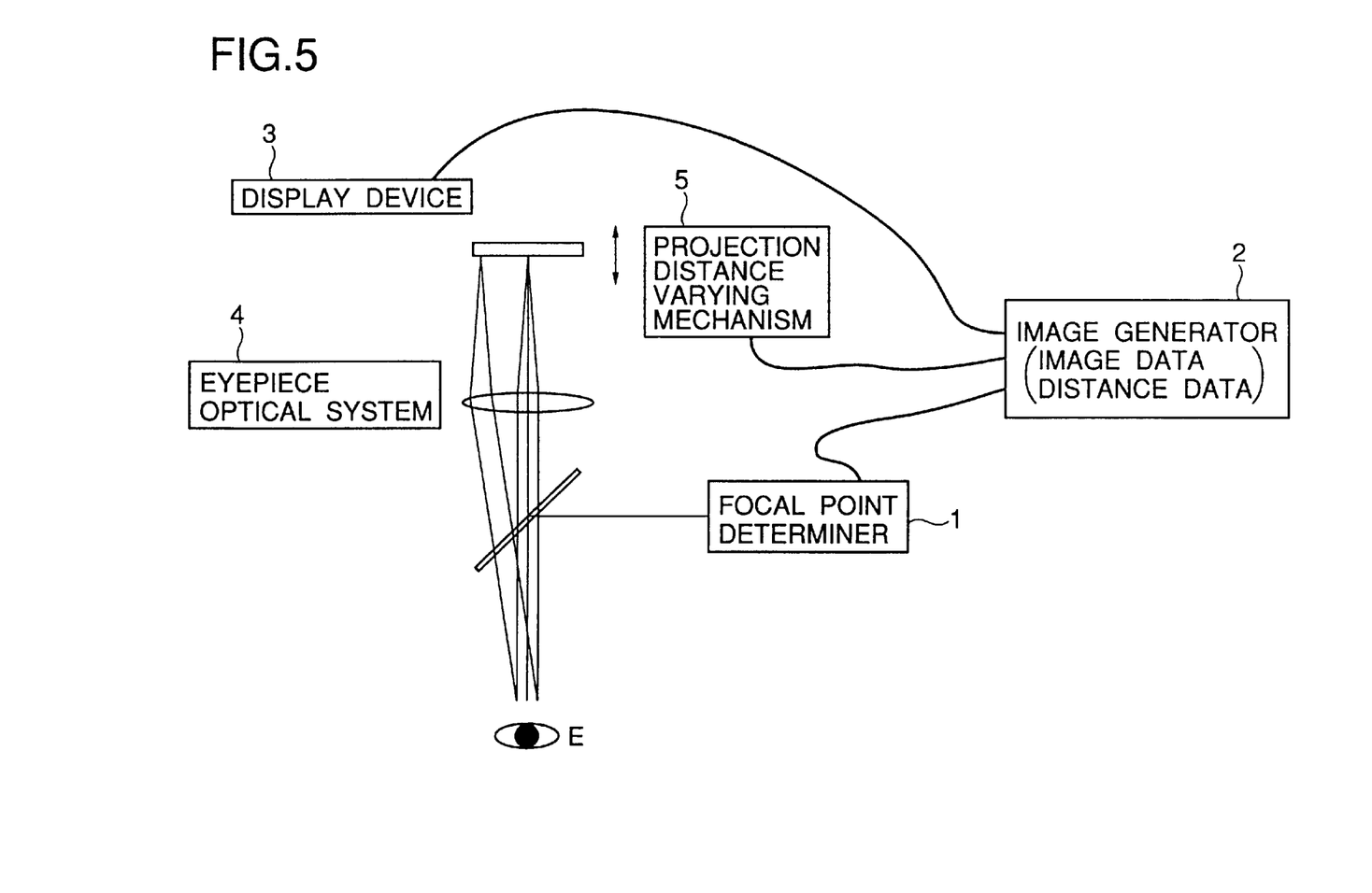
FIG. 5 is a block diagram showing basic structural elements of the stereoscopic image display apparatus embodying the present invention.

Subsequently, the basic construction of the stereoscopic image display apparatus embodying the present invention will be described with respect to one eye side. Principal structural elements include as shown in FIG. 5 a focal point determiner 1, an image generator 2, a display device (two-dimensional display device such as a liquid crystal panel) 3, an eyepiece optical system 4 and a projection distance varying mechanism 5.

The focal point determiner 1 is detecting means for detecting the refractive power of the eye E of the viewer P, calculating the visual range from the eye E to the point of regard (in other words, the position of the point of regard on which the eye E is focused) based on the detected refractive power and outputting the calculated visual range. From the detected visual range, it can be known how many meters there are between the viewer P and the object which the viewer P is viewing.

The image generator 2 is image generating means for generating image display data C(n) on which a blurring processing described later has been performed, based on the visual range detected by the focal point determiner 1, the image data and the distance data. The display device 3 is image displaying means for displaying an image based on the display data C(n) generated by the image generator 2.

The eyepiece optical system 4 is image projecting means for projecting as a virtual image the image displayed by the display device 3. The projection distance varying mechanism 5 is controlling means for controlling the projection distance L of the virtual image by automatic focusing so that the virtual image is projected onto the point of regard of the eye E by moving the virtual image position in a near or far direction without changing the angle of view and the position of the objects (e.g. an apple and a tree) in the original image.

Figure 6:
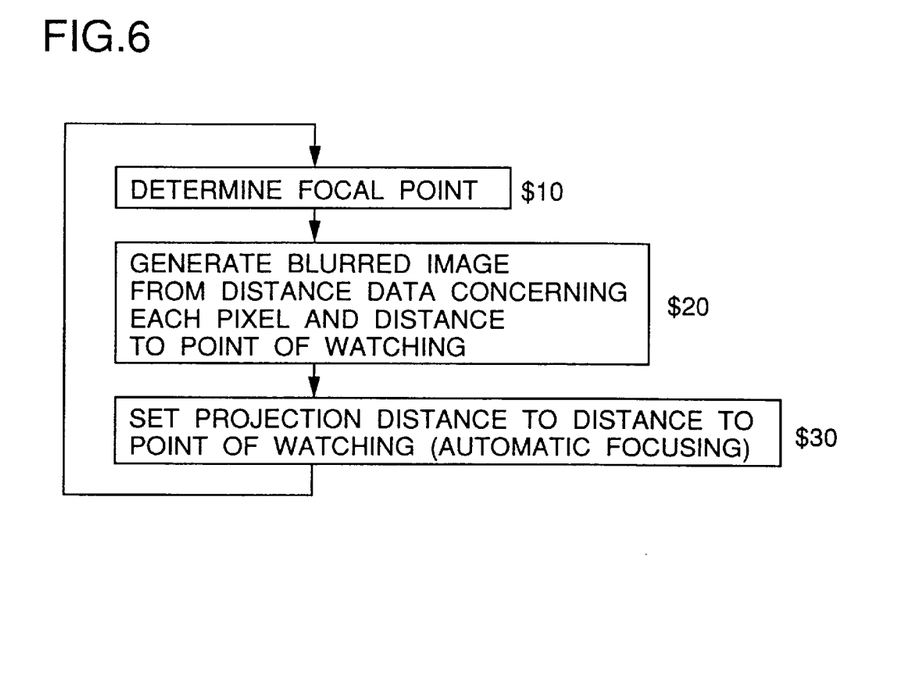
FIG. 6 is a flowchart showing a basic algorithm of the stereoscopic image display apparatus embodying the present invention.

The basic algorithm in FIG. 6 shows a display procedure performed by use of the above-described structural elements. First, the visual range of the eye E is detected by the focal point determiner 1 (step #10). From the detected visual range and the distance data concerning each pixel of the original image, the degree of blur (the amount of blur) of each pixel is calculated. Based on the result of the calculation, the blurring processing is performed on the image data of the original image and the display data of the image are generated (step #20). Then, the display data of the image on which the blurring processing has been performed are displayed by the display device 3, the image is projected as a virtual image by the eyepiece optical system 4, and the virtual image is projected onto the point of regard by the projection distance varying mechanism 5 (step #30).

<<Blurring Processing (FIGS. 7 to 12)>>

Figure 7:
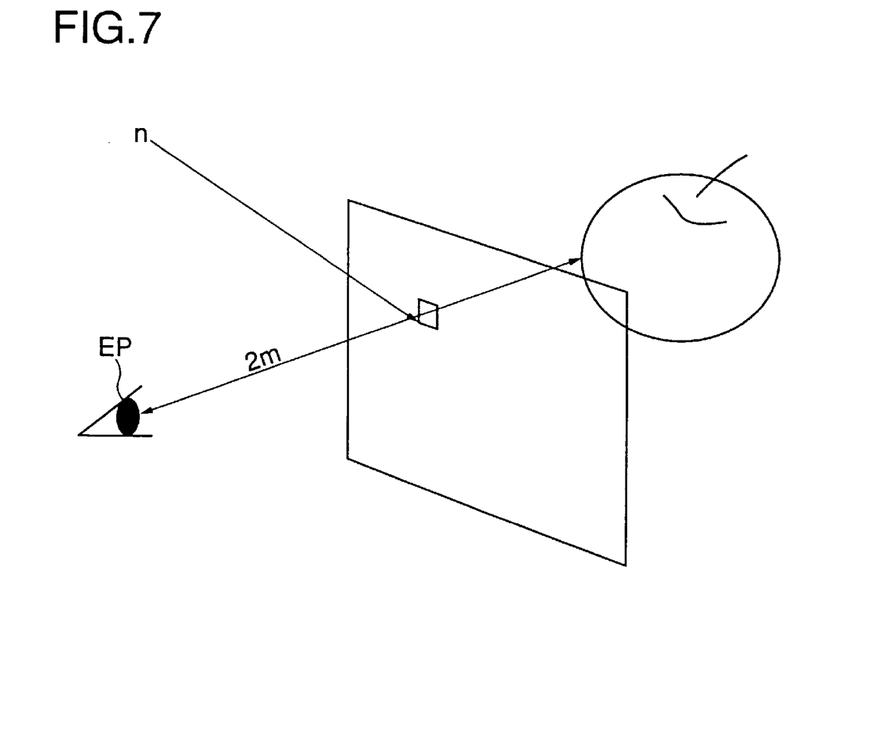
FIG. 7 is a view to help explain a relationship between image data and distance data of an original image.
Figure 8:
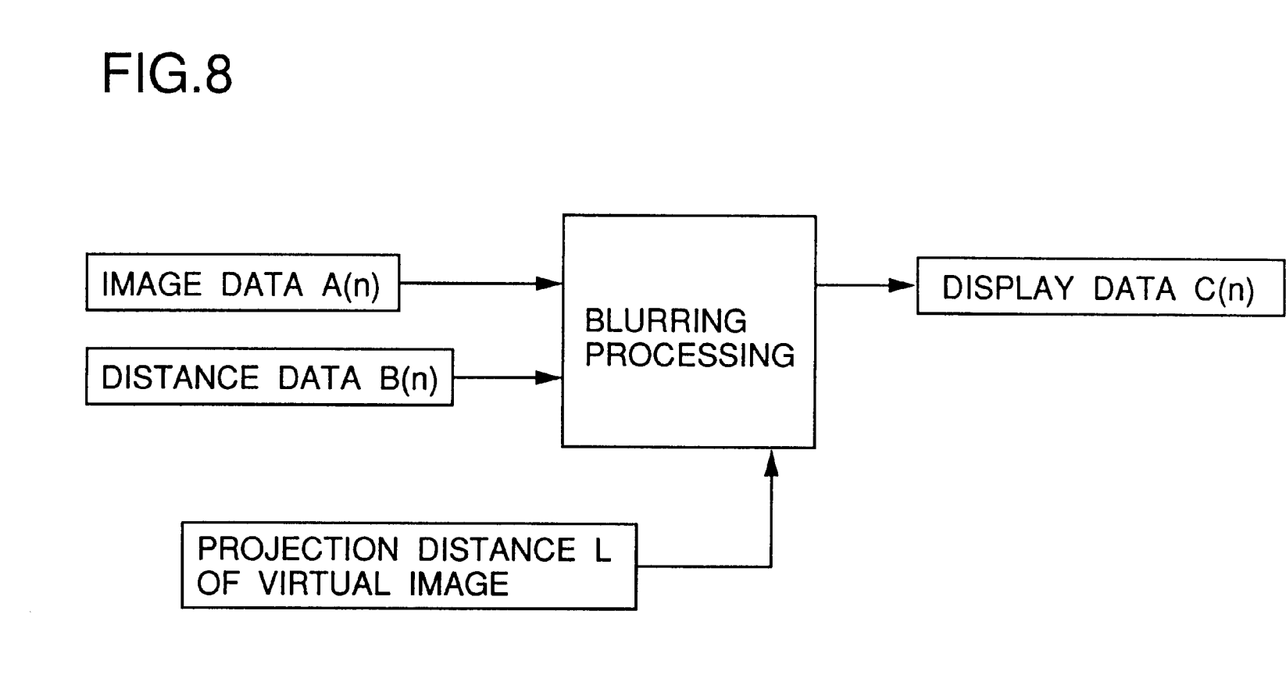
FIG. 8 is a block diagram for a blurring processing.

Subsequently, the blurring processing performed by the image generator 2 (FIG. 5) will be described. An original image constituted by N pixels is prepared. Numbers 1 to N are assigned to the pixels and the number of a given pixel is n. The images (FIGS. 2A, 3A and 4A) of the original image include, with respect to each pixel n of the original image, image data A(n) including color information and luminance information, etc. and distance data B(n) representative of the distance from a pupil EP to an object. For example, when the apple shown in FIG. 7 is displayed, the color information and the luminance information of the apple to be displayed are stored in the image data A(n) and distance information representative of 2 m is stored in the distance data B(n) (here, it is assumed that the greater (farther) the distance is, the higher the value of B(n) is).

Figure 9:
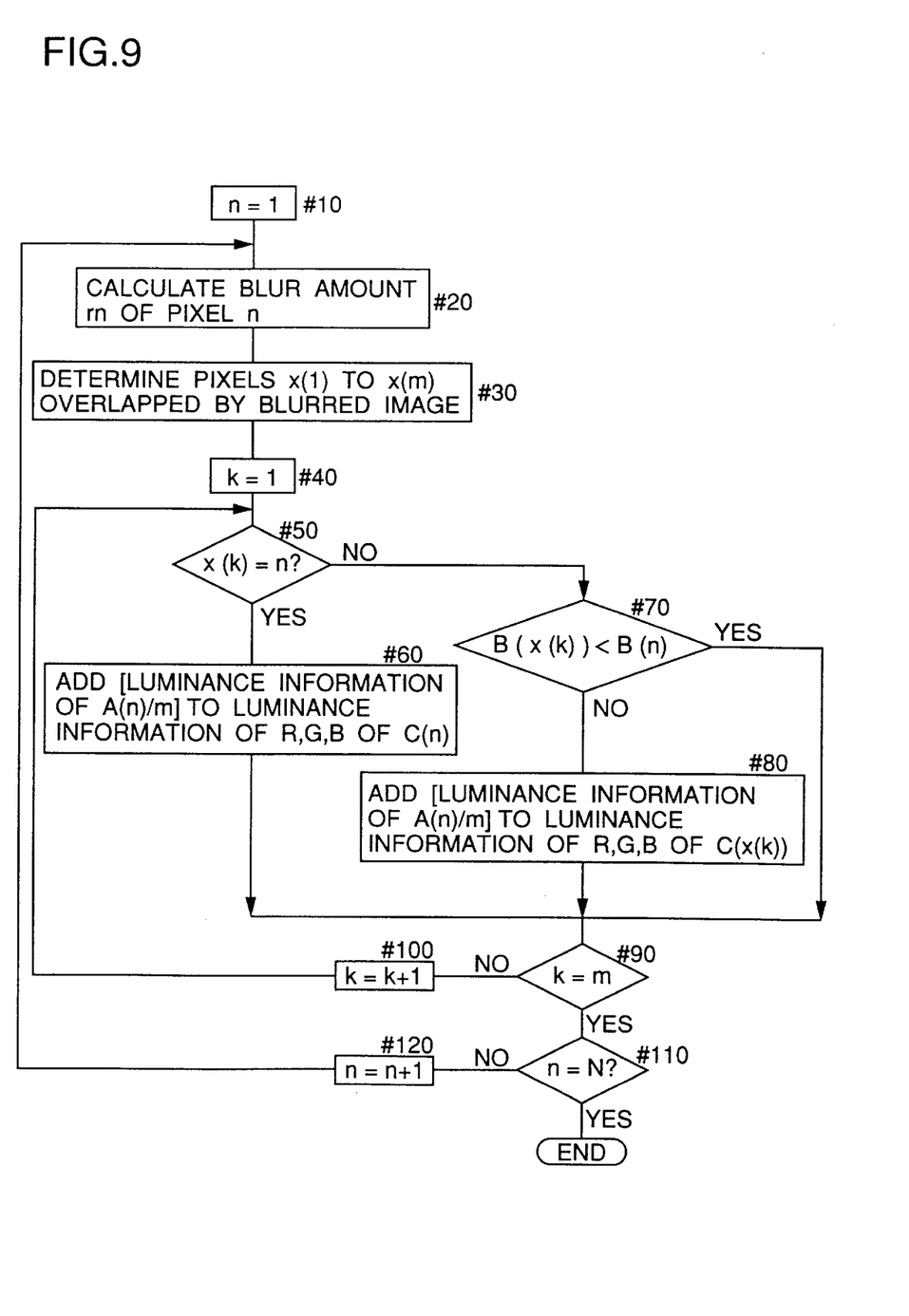
FIG. 9 is a flowchart showing a blurring process performed on an image.

In the image blurring process (FIG. 8), the display data C(n) calculated from the data A(n) and B(n) and the projection distance (i.e. the visual range of the eye E) of the virtual image are used for the image display by the display device 3. The blurring processing for calculating the display data C(n) is successively performed on all of the pixels 1 to N of the original image as described later (FIG. 9). The data A(n) and C(n) can be generally represented by luminance information of each of the three primary colors (R, G, B).

The procedure of the blurring processing on a pixel n will hereinafter be described with reference to the flowchart of FIG. 9. It is assumed that in C(n), information representative of zero luminance is inputted as the initial value before the blurring processing is performed. First, the initial setting of the pixel number is performed (step #10, n=1). Then, an image blur amount rn concerning the pixel n is calculated (step #20).

Figure 10:
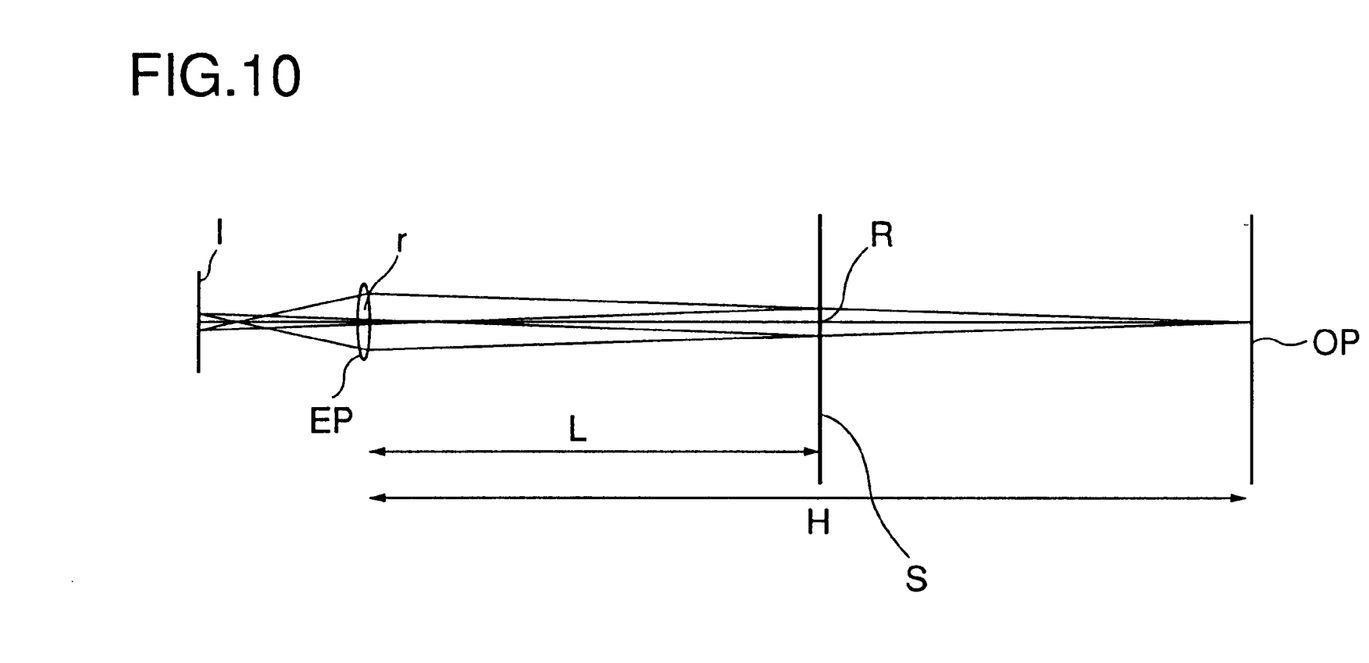
FIG. 10 is a view to help explain blur amount calculation.
Figure 11:
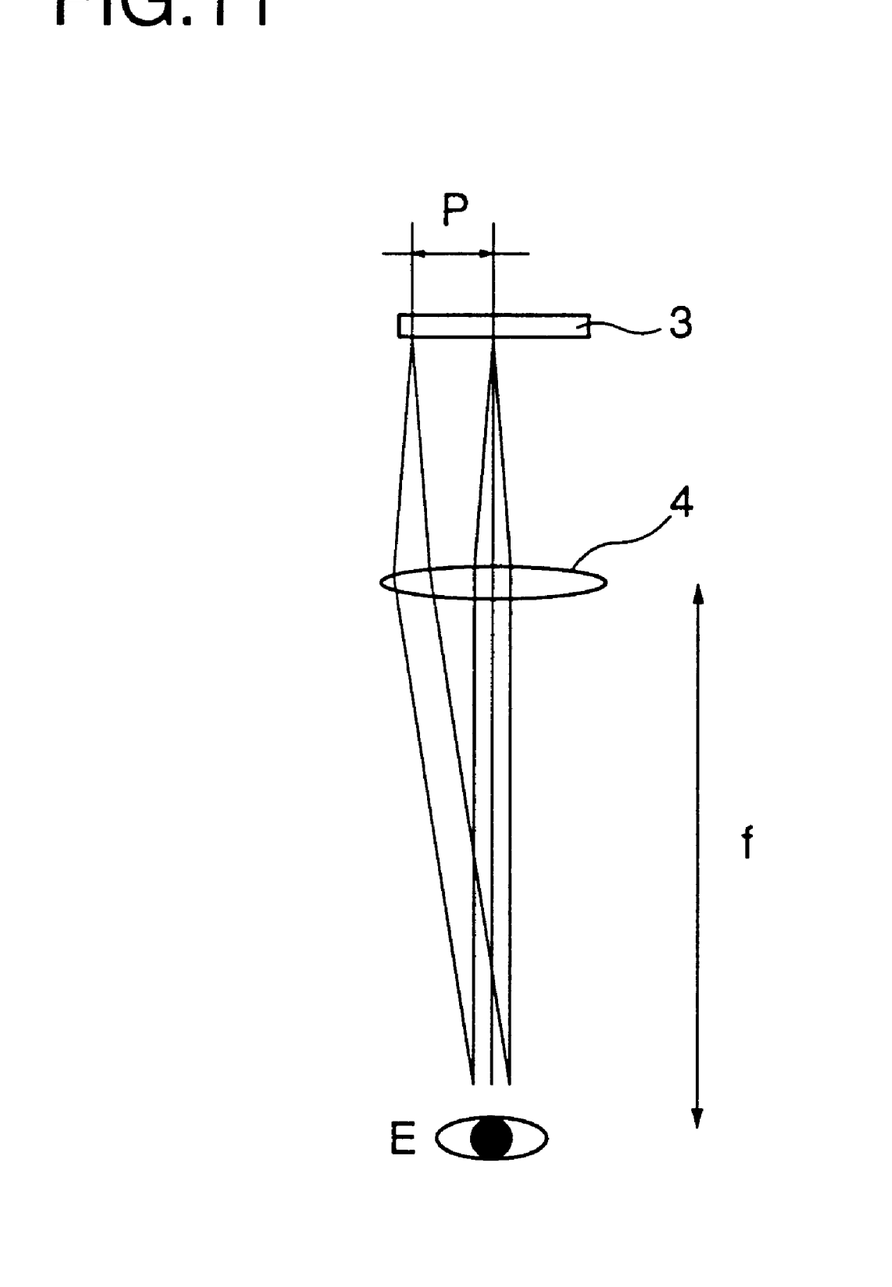
FIG. 11 is a view to help explain an area where the blur concerning a pixel overlaps a peripheral pixel.

Here, the method of calculating the blur amount rn will be described with reference to FIG. 10. The reference characters in FIG. 10 are defined as follows:

I represents an image plane on the retina of the eye E of the viewer P;

EP represents the pupil of the eye E of the viewer P;

r represents the radius of the pupil EP of the viewer P;

S represents the virtual image plane viewed through the eyepiece optical system 4;

R represents the radius of a blurred image on the virtual image plane S;

OP represents an object point where the pixel n for which the blur amount rn is to be calculated is spatially disposed;

H represents the distance from the pupil EP of the viewer P to the object point OP (from the distance data B(n)); and L represents the distance from the pupil EP of the viewer P to the virtual image plane S (from the focal point determiner 1).

When the object point OP is an ideal point image, the blur amount of the object point OP viewed on the virtual image plane S is expressed as the radius of the blurred image on the virtual image plane S: $R=|r \times (H-L)/H|$. Expressing this in angle (radian), the magnitude (radius) of the blur amount is $rn=|2r(H-L)/LH|$(radian). For the radius r of the pupil EP in the actual calculation, the radius of the actual pupil of the viewer P may be measured or a predetermined value (e.g., 1 mm to 5 mm) may be used.

Figure 12:
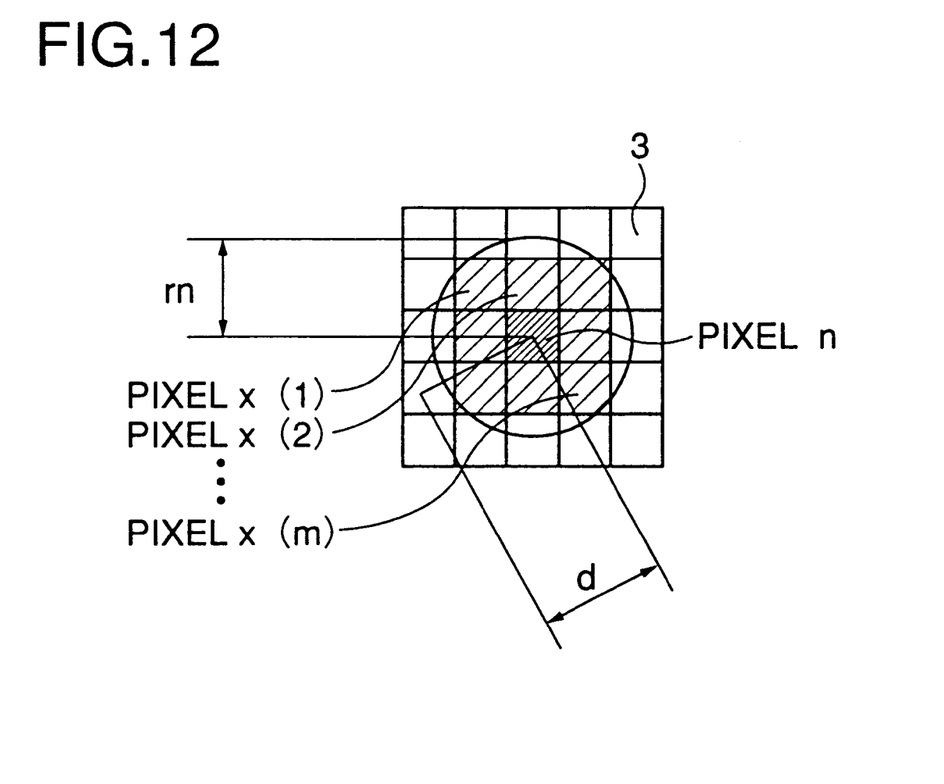
FIG. 12 is a view to help explain an area where the blur concerning a pixel n overlaps peripheral pixels x(1) to x(m)

Reverting to the flowchart of FIG. 9, an area is obtained where the blur concerning the pixel n overlaps pixels situated on the periphery thereof (hereinafter, sometimes referred to as "peripheral pixels") (step #30). As shown in FIG. 1, when an optical system is considered in which the image on the display device 3 is viewed with the eye E being situated in the vicinity of the focal point of the eyepiece optical system 4 (f represents the focal length), a distance p on the display device 3 visually corresponds to p/f (radian). Therefore, as shown in FIG. 12, the distance from the pixel n to a given pixel situated on the periphery thereof is defined as a distance d between the center of the pixel n and the center of the given pixel, and a peripheral pixel situated in a position fulfilling an inequality d/f<rn is defined as a peripheral pixel situated within an area where when the pixel n is blurred, the blur overlaps the given pixel (i.e. area corresponding to the blur amount). The numbers of pixels for which the definition holds are obtained and the pixels are designated as x(1), x(2), . . . , x(m) in increasing order of the number. After the initial setting of the peripheral pixel number k (k=1) is performed at step #40 of FIG. 9, the following processing (steps #50 to #100) is performed on the obtained m pixels x(1) to x(m) in the order of x(1) to x(m).

It is determined whether a peripheral pixel x(k) is the same as the pixel n or not (step #50). When the peripheral pixel x(k) is different from the pixel n, distance data B(x(k)) of the peripheral pixel x(k) situated on the periphery of the pixel n is compared with the distance data B(n) of the pixel n by which the pixel x(k) is overlapped (step #70). When the value of B(x(k)) is substantially the same as that of B(n) (e.g. when the difference in distance between B(x(k)) and B(n) is not more than 10 mm), comparative calculation of the distance data is performed with a limited number of digits of the distance data so that an overlap of the blur as shown in FIGS. 3C and 4C occurs. The limitation of the digits of the distance data is performed, for example, by discarding all the digits not more than 10 mm.

When it is determined at step #70 that the pixel n is situated in front of the peripheral pixel x(k) (when B(x(k)) ≧B(n)), [the luminance information of A(n)/m] is added to the luminance information of the three primary colors of C(x(k)) (step #80). Thereby, the luminance of the pixel n is uniformly distributed among the m peripheral pixels x(1) to x(m). That is, at this step, the luminance information of A(n) is divided by the number (m) of peripheral pixels x(1) to x(m) and the quotient is added to the luminance information of the three primary colors of C(x(k)), whereby the total luminance of the blurred m peripheral pixels x(l) to x(m) equals the luminance of the image data A(n). By this step, an overlapping image is viewed in which a blurred portion of the apple enters the edge of the tree as shown in FIGS. 3C and 4C.

When it is determined at step #70 that the peripheral pixel x(k) is situated in front of the pixel n (when B(x(k))<B(n)), C(x(k)) is not changed. By not changing C(x(k)), the edge of a clear-cut apple is clearly viewed in front of a blurred tree as shown in FIGS. 3B and 4B. Thus, the overlapping of the blur (FIGS. 3C and 4C) is controlled so as to occur only when the pixel n to be blurred is situated closer to the viewer P than the peripheral pixel x(k) not being blurred.

When it is determined at step #50 that the peripheral pixel x(k) is the same as the pixel n, it is unnecessary to perform the comparison of the distance data and [luminance information of A(n)/m] is added to the already stored C(n) (step #60). At step #90, steps #50 to #100 are repeated until k=m. At step #110, display data C(n) is generated for all of the pixels 1 to N by repeating steps #20 to #120 until n=N. Based on the obtained display data C(n), image display is performed by the display device 3, so that an image in which a blur occurs is viewed by the viewer P through the eyepiece optical system 4.

As described above, the image generator 2 obtains the blur amount rn concerning each pixel of the original image (FIGS. 2A, 3A and 4A) from the distance data B(n) and the visual range L (step #20), compares the distance data B(n) concerning each pixel n and the distance data B(x(k)) concerning the peripheral pixel x(k) (step #70), and processes the display data C(x(k)) of the peripheral pixel x(k) so that the blur occurs for the pixel n only for the pixel n having distance data B(n) representative of a shorter distance from the viewer P than the peripheral pixel x(k) (step #80). At step #80, the luminance information of the image data A(n) is distributed among a plurality of peripheral pixels x(k) decided based on the visual range L and the distance data B(n). Step #80 is not performed for the pixel n having distance data B(n) representative of a longer distance from the viewer P than the peripheral pixel x(k). Thus, by performing the blurring processing on the previously generated image data A(n) and distance data B(n), the stereoscopic effect of the stereoscopic image is improved.

The image data A(n) and the distance data B(n) used for the blurring processing have conventionally been used for various types of stereoscopic image display. For example, an image captured by a three-dimensional scanner has both the distance data and the image data of the pixels constituting the image. According to this embodiment, even such an image can be viewed as a natural stereoscopic image. In computers and game apparatuses generating three-dimensional graphics, distance data of each pixel are generated in the process of generating image data and the distance data are stored in a memory called a Z buffer. Thus, according to this embodiment, natural stereoscopic images can be viewed by capitalizing on hardware and software of such existing apparatuses.

<<Optical Arrangement of Laser Scanning Type HMD (FIG. 13)>>

Figure 13:
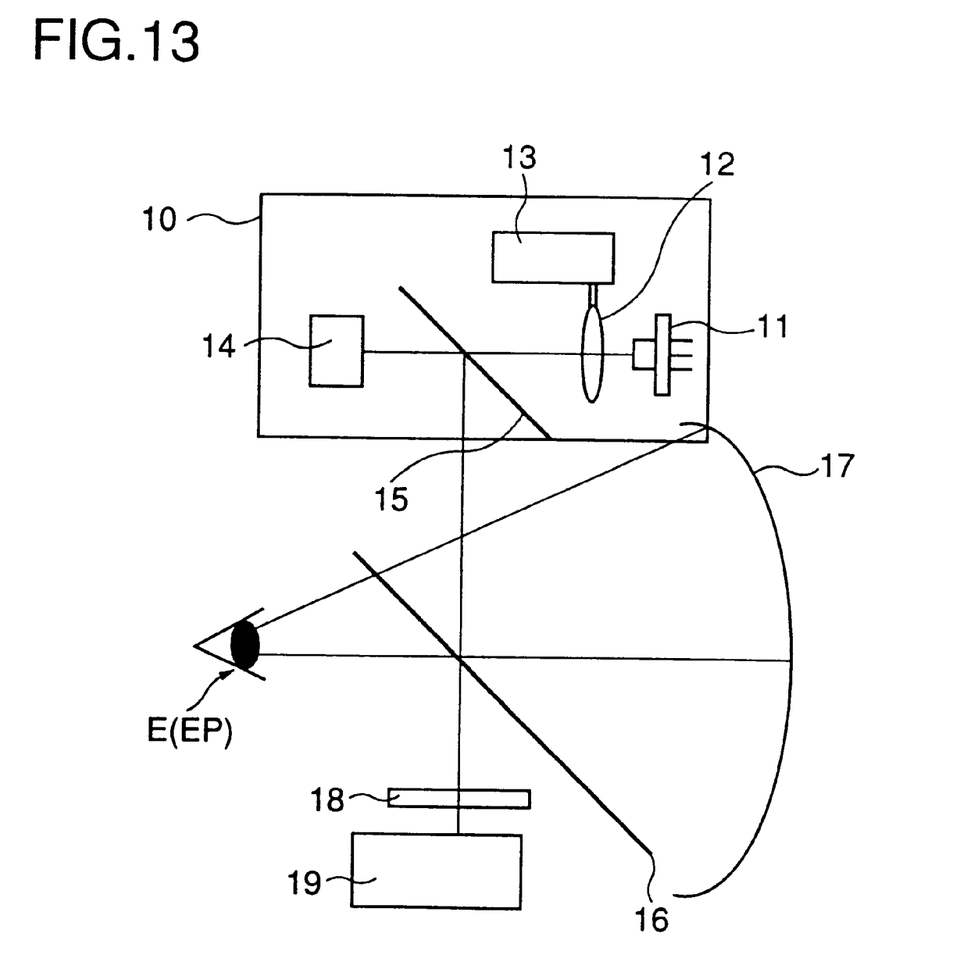
FIG. 13 is a longitudinal cross-sectional view schematically showing the optical arrangement of a laser scanning type HMD embodying the present invention.

FIG. 13 shows the optical arrangement of a laser scanning type HMD embodying the present invention. The HMD comprises a display unit 10 constituting image displaying means and controlling means, a half mirror 16 and a concave mirror 17 constituting image projecting means (eyepiece optical system), and an infrared transmitting filter 18 and a focus detecting unit 19 constituting detecting means. Instead of the two-dimensional display device 3 (FIG. 5) of the previously described stereoscopic image display apparatus, a laser scanner 14, etc. is used as the image displaying means.

The display unit 10 comprises a laser light source (including a driver) for emitting a laser beam based on the display data generated by the image generator 2 (FIG. 5), a condenser lens 12 for condensing the laser beam emitted from the laser light source 11, a focusing mechanism (comprising, for example, a linear motor, etc.) 13, a laser scanner (comprising, for example, a polygonal mirror and a galvanometer mirror, etc.) 14, and a half mirror 15. The image displaying means for displaying an image based on the display data comprises the laser light source 11, the condenser lens 12, the laser scanner 14 and the half mirror 15. The controlling means for controlling the distance between the laser light source 11 and the condenser lens 12 so that the virtual image is projected onto the point of regard of the eye E comprises the condenser lens 12 and the focusing mechanism 13.

The laser beam from the laser light source 11 is made convergent by the condenser lens 12 and is transmitted by the half mirror 15. The condenser lens 12, which is connected to the focusing mechanism 13, is driven in the direction of the optical axis in accordance with a control signal from the focusing mechanism 13. The laser beam transmitted by the half mirror 15 is two-dimensionally scanned by the laser scanner 14, thereby forming an intermediate image. The laser beam exiting from the laser scanner 14 is reflected at the half mirror 15 and directed to the half mirror 16. Then, after being reflected at the half mirror 16 and at the concave mirror 17 and transmitted by the half mirror 16, the laser beam is directed to the eye EP of the viewer P.

Thus, the eyepiece optical system comprising the half mirror 16 and the concave mirror 17 projects as a virtual image the intermediate image formed by the laser scanner 14. The reflecting surface of the concave mirror 17 is a spherical surface with the position of the pupil EP substantially as the center, and the laser scanner 14 is disposed in a position substantially equivalent to the spherical center of the reflecting surface of the concave mirror 17. A substantially spherical intermediate image is formed by the display unit 10, and the intermediate image and the reflecting surface of the concave mirror 17 are substantially concentric with each other.

The focus detecting unit 19 disposed below the half mirror 16 is designed so that an infrared index is projected onto the retina of the eye E, the contrast thereof is measured to thereby detect the focus condition of the eye E and the visual range is obtained from the result of the detection. The optical path from the focus detecting unit 19 to the eye E is bent by the half mirror 16. To avoid the laser beam directly incident on the focus detecting unit 19 from the display unit 10 through the half mirror 16, the infrared transmitting filter 18, transmitting only infrared rays, is disposed between the half mirror 16 and the focus detecting unit 19. Noises are reduced by the infrared transmitting filter 18.

Focusing is performed by moving the condenser lens 12 by the focusing mechanism 13. Even if the virtual image position is adjusted by focusing, the visual size of the image (image position on the retina) decided by the scanning angle of the laser scanner 14 does not change. Thus, since the virtual image position can be adjusted, without the image size being changed, by moving the small condenser lens 12, the overall size of the stereoscopic image display apparatus is greatly reduced. While the laser light source 11 is included in the display unit 10 in this HMD, a color stereoscopic image display can be achieved by providing a light source unit separately from the display unit 10, inputting beams (R, G, B) from three laser light sources to a fiber and disposing the output side end surface of the fiber in the position of the light source in FIG. 13.

When a two-dimensional display device (liquid crystal panel, etc.) like the display device 3 (FIG. 5) is used, the display device 3 and the eyepiece optical system 4 are moved in order to change the projection distance L. Since these elements are comparatively large in size, it is not easy to move them with sufficient accuracy. Moreover, in order to prevent image degradation due to aberration from occurring when the distance between the display device 3 and the eyepiece optical system 4 is changed, a complicated optical system is required. When a display device which performs display by laser scanning is used as shown in FIG. 13, it is only necessary to move comparatively small elements such as the laser light source 11 and the condenser lens 12, so that the projection distance L can be more easily changed with high accuracy. In addition, since the eyepiece optical system 4 (FIG. 5) comprises the half mirror 16 and the concave mirror 17, projection without any image degradation can be achieved in spite of the simple arrangement.

<<Concrete Construction of Binocular HMD (FIG. 14)>>

Figure 14:
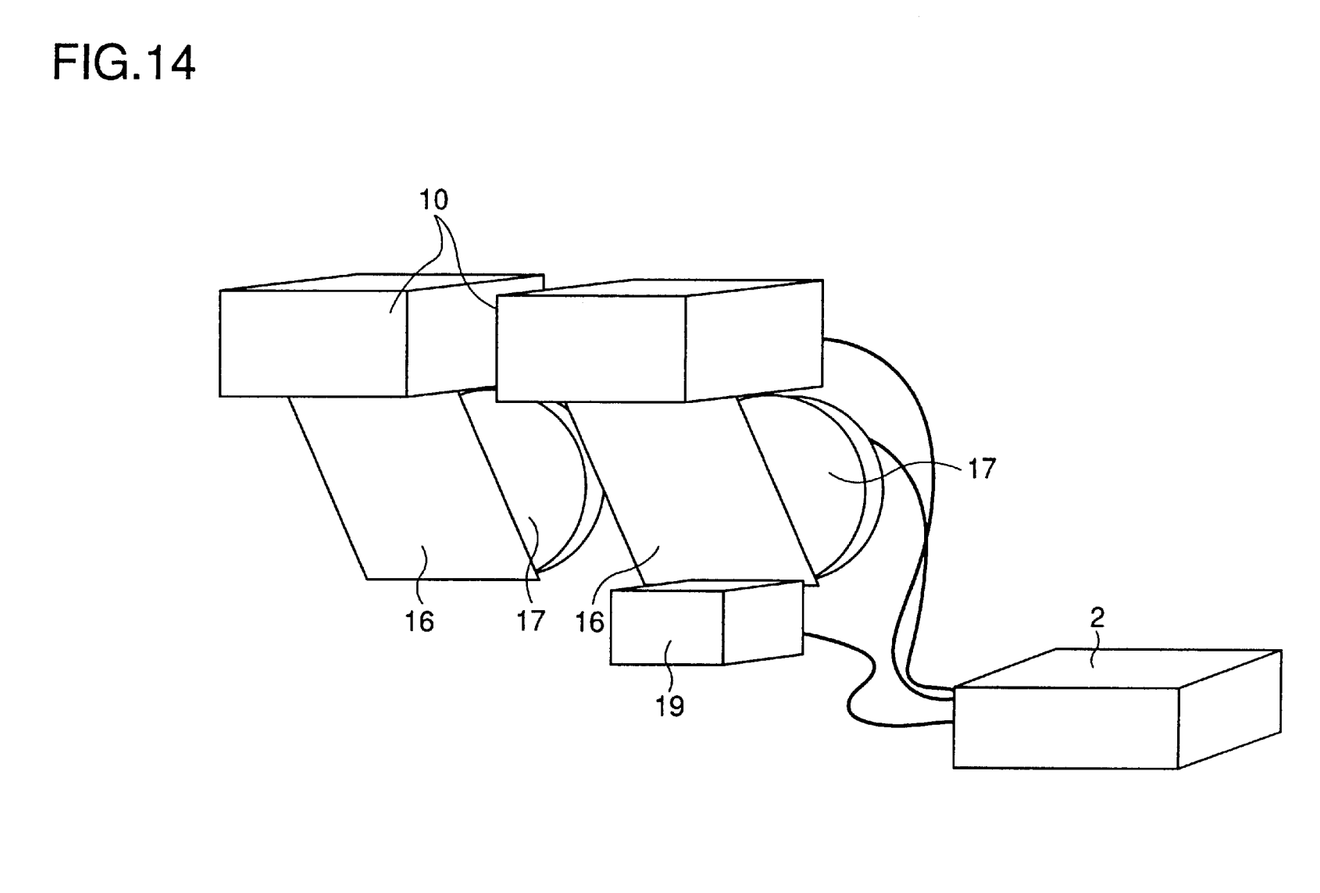
FIG. 14 is a perspective view schematically showing the external construction of a binocular HMD embodying the present invention.

FIG. 14 shows the external construction of an HMD in which the above-described HMD (FIG. 13) is configured as a binocular HMD. The HMD has a viewing optical system comprising the display unit 10, the half mirror 16 and the concave mirror 17 for each of the left and right eyes and stereoscopic images can be viewed through the HMD. The focus detecting unit 19 is provided only on the right eye side. The focusing mechanism 13 is controlled based on a signal from the focus detecting unit 19 to thereby performing focusing of both of the left and right eyes. The previously described blurring processing is performed based on a signal from the focus detecting unit 19 and a signal from the image generator 2.

Obviously, many modifications and variations of the present invention are possible in light of the above teachings. It is therefore to be understood that within the scope of the appended claims, the invention may be practiced other than as specifically described.

This application is based on application No. H09-043468 filed in Japan, the content of which is hereby incorporated by reference.

What is claimed is:

1. A display apparatus for displaying an image based on image data and distance data concerning each pixel of the image, the apparatus comprising:

means for detecting a visual range from a viewer's eye to a viewer's point of regard;

means for generating display data based on the image data, the distance data, and a detected visual range;

means for displaying an image based on the display data;

means for projecting a displayed image as a virtual image; and means for controlling a projection distance of the virtual image so that the virtual image is projected in consideration of the point of regard, wherein said generating means is adapted to perform a blurring process on any portion of a displayed image not situated at the point of regard.

2. A display apparatus as claimed in claim 1, wherein said detecting means detects the visual range based on a refractive power of the viewer's eye.

3. A display apparatus as claimed in claim 1, wherein said detecting means detects the visual range based on a convergence position of the viewer's eye.

4. A display apparatus as claimed in claim 1, wherein said controlling means comprises means for moving said displaying means.

5. A display apparatus as claimed in claim 1, further comprising means for performing processing so that the blurring process is not performed on an area of the displayed image in which a blurred portion of the displayed image having distance data representative of a long distance relative to the viewer would overlap another portion of the displayed image having distance data representative of a short distance relative to the viewer.

6. A display apparatus for displaying an image based on image data and distance data concerning each pixel of the image, the apparatus comprising:

first means for displaying in focus any portion of the image situated at a predetermined distance; and second means for displaying a blurred image, produced from the image data, for any portion of the image not situated at said predetermined distance.

7. A display apparatus as claimed in claim 6, wherein said predetermined distance is a viewer's viewing distance.

8. A display apparatus as claimed in claim 6, further comprising means for detecting a visual range relative to a user, wherein said second displaying means comprises means for generating display data representative of the blurred image based on a detected visual range, the image data, and the distance data.

9. A display apparatus as claimed in claim 8, wherein said visual range is a distance from a viewer's eye to the viewer's point of regard.

10. A display apparatus as claimed in claim 8, wherein said first display means and said second displaying means each comprise means for projecting respective images as virtual images.

11. A display apparatus as claimed in claim 10, wherein each of said means for projecting respectively comprise means for changing a position where said virtual image is projected.

12. A display apparatus as claimed in claim 11, wherein each of said means for projecting is adapted to project the image of each of the first displaying means and said second displaying means onto a point of regard.

13. A display apparatus as claimed in claim 8, wherein the second means for displaying is adapted to not display at least a portion of the blurred image when such portion corresponds to distance data representative of a long distance from a viewer and such portion overlaps another portion of the image having distance data corresponding to a short distance from the viewer.

14. A display apparatus comprising:

means for receiving image data;

means for detecting a visual range;

means for performing a blurring process for at least a portion of received image data in accordance with the detected visual range; and means for displaying an image based on the image data on which the blurring process has been performed.

15. A display apparatus as claimed in claim 14, wherein said displaying means comprises a laser light source for emitting a laser beam.

16. A display apparatus as claimed in claim 15, wherein said means for displaying further comprises a condenser lens for condensing the laser beam, means for scanning a condensed laser beam, and an eyepiece optical system for projecting as a virtual image an image formed by the scanning means.

17. A display apparatus as claimed in claim 16, wherein said virtual image is projected onto a point of regard.

18. A display apparatus as claimed in claim 16, further comprising means for controlling a distance between the laser light source and the condenser lens in order to project said virtual image onto a convergence position.

19. A display apparatus as claimed in claim 14, wherein said means for detecting is adapted to detect the visual range based on a refractive power of a viewer's eye.

20. A display apparatus for displaying an image based on image data and distance data concerning each pixel of the image, the apparatus comprising:

an image generator to generate image data for display;

a first controller, coupled to the image generator to receive image data therefrom, that is capable of accentuating any portion of the image situated at a viewer's point of regard;

a second controller, coupled to the image generator to receive image data therefrom, that is capable of deaccentuating any portion of the image not situated at the viewer's point of regard, whereas a deaccentuated image portion remains visually perceivable; and a display, coupled to the first controller and the second controller, to display image data supplied from the first controller and the second controller.

21. A display apparatus as claimed in claim 20, wherein the second controller is capable of blurring any portion of the image not at the viewer's point of regard.

22. A display apparatus for displaying an image based on image data and distance data concerning each pixel of the image, the apparatus comprising:

a focal point determiner that is adapted to determine a visual range from a viewer's eye to a viewer's point of regard;

an image generator to generate display image data based on the image data, the distance data, and the detected visual range, wherein the image generator is adapted to emphasize any portion of the image at the viewer's point of regard and adapted to de-emphasize any portion of the image not situated at the viewer's point of regard, whereas a de-emphasized image portion remains visually perceivable; and a display device to display generated image data.

23. A display apparatus as claimed in claim 22, wherein the image generator is adapted to blur any portion of the image not situated at the viewer's point of regard.

* * * * *